(12) United States Patent
Stauffer

(10) Patent No.: US 8,927,143 B2
(45) Date of Patent: Jan. 6, 2015

(54) ALUMINUM STORAGE BATTERY

(76) Inventor: John E. Stauffer, Greenwich, CT (US)

(*) Notice: Subject to any disclaimer, the term of this patent is extended or adjusted under 35 U.S.C. 154(b) by 371 days.

(21) Appl. No.: 13/312,407

(22) Filed: Dec. 6, 2011

(65) Prior Publication Data
US 2013/0143113 A1 Jun. 6, 2013

(51) Int. Cl.
H01M 10/08 (2006.01)

(52) U.S. Cl.
USPC .......... 429/205; 429/101; 429/102; 429/122; 429/208; 429/218.1; 429/225

(58) Field of Classification Search
USPC .............. 429/101, 102, 122, 205, 208, 218.1, 429/225
See application file for complete search history.

(56) References Cited

U.S. PATENT DOCUMENTS

| | | | | |
|---|---|---|---|---|
| 3,433,672 A * | 3/1969 | Scholzel | ............. | 429/101 |
| 3,862,862 A * | 1/1975 | Gillibrand et al. | ............. | 427/58 |
| 3,887,399 A * | 6/1975 | Seiger | ............. | 429/102 |
| 3,964,927 A * | 6/1976 | Villarreal-Dominguez | .. | 429/205 |
| 4,107,407 A * | 8/1978 | Koch | ............. | 429/225 |
| 4,327,157 A * | 4/1982 | Himy et al. | ............. | 429/61 |
| 5,034,291 A * | 7/1991 | Jacus | ............. | 429/206 |
| 5,264,298 A * | 11/1993 | Townsend | ............. | 429/419 |
| 5,346,783 A * | 9/1994 | Tomantschger et al. | ........ | 429/66 |
| 5,462,821 A * | 10/1995 | Onoue et al. | ............. | 429/218.1 |
| 6,117,196 A * | 9/2000 | Snyder et al. | ............. | 29/623.5 |
| 2002/0106560 A1* | 8/2002 | Kolb et al. | ............. | 429/212 |
| 2007/0009771 A1* | 1/2007 | Leddy et al. | ............. | 429/10 |
| 2009/0053596 A1* | 2/2009 | Stauffer | ............. | 429/188 |
| 2009/0169978 A1* | 7/2009 | Smith et al. | ............. | 429/82 |
| 2010/0261053 A1* | 10/2010 | Stauffer | ............. | 429/207 |
| 2012/0171574 A1* | 7/2012 | Zhamu et al. | ............. | 429/300 |

FOREIGN PATENT DOCUMENTS

JP 2009-266675 * 11/2009 ............ H01M 12/08

OTHER PUBLICATIONS

Dickey et al., "Eutectic Gallium—Indium (EGaIn): A Liquid Metal Alloy for the Formation of Stable structures in Microchannels at Room Temperature," Adv. Funct. Mater., 2008, 18, 1097-1104.*

* cited by examiner

Primary Examiner — Ula C. Ruddock
Assistant Examiner — Amanda Barrow
(74) Attorney, Agent, or Firm — Young Basile Hanlon & MacFarlane PC

(57) ABSTRACT

A storage battery is provided comprising a positive electrode of lead, a negative electrode of gallium and an aqueous electrolyte containing aluminum sulfate. Upon charging the cell, lead dioxide is formed and aluminum is alloyed with the gallium. During discharge, aluminum goes back into solution and lead dioxide is reduced to lead sulfate.

4 Claims, 1 Drawing Sheet

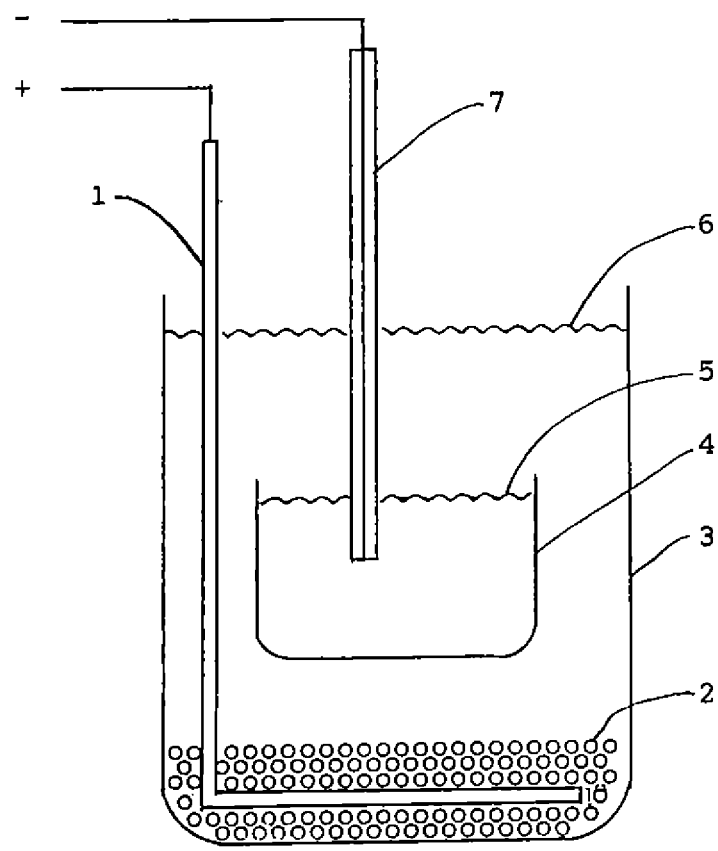

ALUMINUM STORAGE BATTERY

FIELD OF THE INVENTION

The invention relates to a novel type of storage battery that is distinguished by its unique electrochemistry. The positive electrode of the battery is fabricated from lead. The negative electrode is liquid gallium. The electrolyte for the battery is an aqueous solution of aluminum sulfate. Upon charging the battery, lead dioxide is formed at the positive electrode and aluminum is dissolved in the gallium negative electrode. When the battery is discharged, lead dioxide is reduced to the plumbous form, usually as a lead sulfate, and aluminum is oxidized to the aluminum ion, which goes into solution.

BACKGROUND OF THE INVENTION

Aluminum is an attractive candidate for use as an anode material in batteries. This metal has a high standard potential, low atomic weight, and multivalent charge. These attributes result in a theoretically high electrochemical equivalence.

In practice, however, aluminum batteries have eluded commercialization. A protective film on aluminum metal hampers its performance as an anode. The closest approach of a practical application is the aluminum/air battery. This design is a so-called "mechanically" rechargeable battery such that the aluminum anode is physically replaced after each discharge.

The best performance achieved by an aluminum/air cell is in the range of 1.2 to 1.5 v. The actual potential will depend on a number of factors, but the electrolyte, which may be a saline system or an alkaline solution, is important. A saline electrolyte has advantages for sea water batteries used in such application as ocean buoys and underwater vehicles.

Notwithstanding the limited success to date, the interest in aluminum batteries is ongoing. With this sentiment as background for further development, the goal of the present invention is to provide a truly secondary battery that can be recharged from an electrical power supply. This goal as well as other objects, features and advantages of the invention will be recognized from the following description and the accompanying figure.

SUMMARY OF THE INVENTION

The invention is a rechargeable battery in which the positive electrode comprises a lead-based material and the negative electrode liquid gallium. The electrolyte comprises an aqueous solution of aluminum sulfate. Upon charging the battery, lead dioxide formed at the positive electrode and aluminum metal is dissolved in the gallium. On discharge, lead dioxide is reduced to a plumbous compound, most likely sulfate, and aluminum metal goes into solution as an ion.

The configuration of the principal elements of the battery is flexible. A primary concern is to isolate the liquid gallium from contact with the positive electrode. Depending on the application, means may be required to maintain the gallium in the liquid state. The gallium need not be pure, but it may be alloyed with other metals including indium and mercury. The electrolyte may contain alum.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying photographs, the latter being briefly described hereinafter.

BRIEF SUMMARY OF THE DRAWINGS

The description herein makes reference to the accompanying drawings wherein like reference numerals refer to like parts throughout the several views and wherein:

FIG. 1 is a schematic drawing of a prototype battery according to the key features of the present invention.

DETAILED DESCRIPTION OF THE ILLUSTRATIVE EMBODIMENT

The electrochemistry of the aluminum storage battery of the present invention can be best illustrated by the following equation. Upon discharge, the reaction at the positive electrode is:

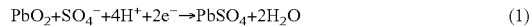

$$PbO_2 + SO_4^- + 4H^+ + 2e^- \rightarrow PbSO_4 + 2H_2O \tag{1}$$

The reaction of the negative electrode is given by:

$$Al(Ga) \rightarrow Al^{3+} + Ga + 3e^- \tag{2}$$

By combining the above equations, the overall reaction for the cell upon discharge is shown to be:

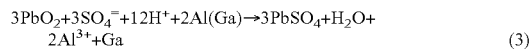

$$3PbO_2 + 3SO_4^- + 12H^+ + 2Al(Ga) \rightarrow 3PbSO_4 + H_2O + 2Al^{3+} + Ga \tag{3}$$

The above reactions are reversed when the cell is charged.

A key feature of the cell is the gallium electrode which is in the molten state. The element melts at 29.8° C. and remains a liquid up to about 2200° C. The liquid metal has complete miscibility with aluminum without the formation of compounds.

Gallium also is completely miscible with indium and forms a eutectic with this metal. A mix of 76 percent gallium and 24 percent indium melts at 15.7° C. In addition, gallium forms an amalgam with mercury.

The electrolyte of the cell is prepared from an aqueous solution of aluminum sulfate. This salt is very soluble in water. At 0° C. a total of 31.3 gm of aluminum sulfate can be dissolved in 100 ml. of water, and at 100° C. the figure is 89 gm. In addition, alum or sodium aluminum sulfate is highly soluble.

By referring to equation 3, the electrolyte is seen to be acidic when the battery is in the charged condition. Upon discharge, the electrolyte reverts to neutrality. At no time does the electrolyte become alkaline. This prerequisite is significant because aluminum hydroxide is insoluble and would therefore form deposits in the cell.

For a better understanding of the aluminum storage battery of the present invention, FIG. 1 shows an experimental cell. The positive electrode 1 is a lead strip, which is embedded in a layer of lead shot 2 that rests at the bottom of a large glass jar 3. The small glass jar 4 holds the liquid gallium 5, which serves as the negative electrode. The small glass jar is immersed in the electrolyte 6. A hollow glass tube 7 containing a copper wire connects the liquid gallium to the negative electrical lead.

The experimental cell thus described is simple in design and easy to assemble. Bing fabricated from glass, the cell can easily be observed during operation. Undoubtedly an industrial cell would deviate from the above design. The accumulated knowledge in batter technology would serve to meet the needs of a commercial product.

EXAMPLE

An experimental cell was assembled from a large glass jar 3 in. in diameter by 2.5 in. high and a small glass jar 2 in. in diameter by 1.25 in. high. The positive electrode was a 2.5 diameter lead disc embedded in a half-inch thick layer of lead shot No. 10. The negative electrode comprised 250 gm. of liquid gallium 99.99 percent (metal basis). This electrode was connected to the negative lead by a hollow glass tube containing a copper wire. For the electrolyte, 86.8 gm. of aluminum sulfate octadecahydrate, 98+ percent ACS, was dissolved in 150 ml, water. During the experiment the cell was held at about 86° F. After charging the battery at 3.5 volts for 7 minutes, a cell potential of 2.05 volts was obtained. Upon discharging, a steady current of 40 milliamps was obtained through a flashlight bulb. At the end of the run, the electrodes were in excellent condition and the electrolyte was water-white.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A storage battery comprising:
   (a) a positive electrode of lead-based material;
   (b) a negative electrode consisting of one of the following:
      aluminum metal dissolved in liquid gallium, or
      aluminum metal dissolved in a liquid gallium alloy, wherein the liquid gallium alloy is selected from the group consisting of a gallium-indium alloy, a gallium-mercury alloy, or a gallium-indium-mercury alloy, wherein gallium is the majority constituent within the gallium alloy; and
   (c) an aqueous electrolyte comprising an aluminum sulfate solution.

2. The storage battery defined in claim 1 in which the electrolyte contains alum or sodium aluminum sulfate.

3. A method of producing a usable electric potential by way of a storage battery that has a positive electrode of lead-based material, a negative electrode consisting of one of liquid gallium or liquid gallium alloyed with one or more of indium and mercury, wherein the liquid gallium is the majority constituent within the alloy, and an electrolyte comprising an aqueous solution of aluminum sulfate, wherein the method consists of two steps, first, charging the battery such that lead dioxide is formed at the positive electrode and aluminum is produced at the negative electrode, and second, discharging the battery whereby lead dioxide at the positive electrode is reduced to divalent lead sulfate, and aluminum at the negative electrode is oxidized to aluminum ions.

4. The storage battery defined in claim 1 wherein the electrolyte is a solution Aluminum sulfate octadecahydrate.

* * * * *